United States Patent [19]
Krumbein

[11] 3,789,685
[45] Feb. 5, 1974

[54] VARIABLE-SPEED BELT GEAR

[75] Inventor: Fritz Krumbein, Stuttgart-Mohringen, Germany

[73] Assignee: Robert Bosch Photokino GmbH, Stuttgart, Germany

[22] Filed: June 28, 1972

[21] Appl. No.: 267,173

[30] Foreign Application Priority Data
July 7, 1971 Germany............................ 2133691

[52] U.S. Cl. ............................................. 74/242.3
[51] Int. Cl. ............................................. F16h 7/08
[58] Field of Search........................ 74/242.3, 242.7

[56] References Cited
UNITED STATES PATENTS
3,570,318   3/1971   Nakadaira......................... 74/242.3
FOREIGN PATENTS OR APPLICATIONS
782,395   8/1955   Great Britain..................... 74/242.3
94,724   6/1921   Switzerland........................ 74/242.3

*Primary Examiner*—Charles J. Myhre
*Assistant Examiner*—R. H. Lazarus
*Attorney, Agent, or Firm*—Michael S. Striker

[57] ABSTRACT

A belt gear wherein a first two-step pulley receives torque from a motor and drives a second two-step pulley by way of an endless belt. The mechanism for changing the speed of the second pulley has a selector knob which is rotatable between first and second angular positions and is coaxial with a shifter lever having a fork which straddles a portion of the belt between the two pulleys. One leg of a torsion spring is coupled to an eccentric pin of the knob and the other leg of the torsion spring is coupled to the shifter lever. The spring biases the knob to the second angular position as soon as the knob is rotated, either by hand or by remote control, beyond an intermediate dead-center position on its way from the first angular position, and vice versa. In the first angular position of the knob, the spring biases the shifter lever toward a position in which the lever tends to maintain the belt in engagement with the larger rim portion of one of the pulleys and the smaller rim portion of the other pulley. In the second angular position of the knob, the spring tends to move the shifter lever to a position in which the belt is trained over the smaller rim portion of the one pulley and the larger rim portion of the other pulley. The spring is capable of shifting the belt by way of the lever only when the belt is driven by the first pulley.

11 Claims, 3 Drawing Figures

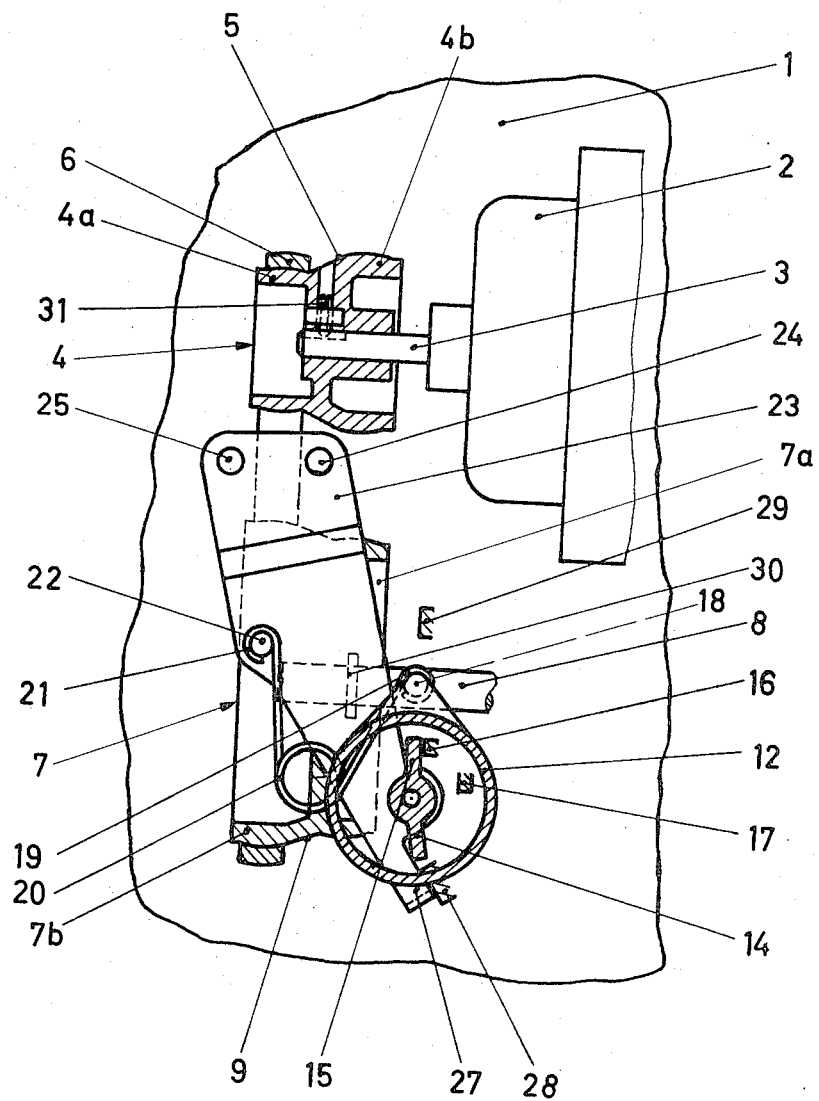

VARIABLE-SPEED BELT GEAR

BACKGROUND OF THE INVENTION

The present invention relates to improvements in belt gears in general, and more particularly to improvements in belt gears which can be utilized in photographic apparatus including cameras, projectors or the like. Still more particularly, the invention relates to improvements in belt gears which are especially suited for use in motion picture projectors (for example, to drive a reel or spool for motion picture film at several speeds) and which utilize spring-biased shifters for endless belts, cords, cables, ropes or analogous motion transmitting elements (hereinafter called belts).

Many presently known belt gears are constructed in such a way that the belt can be shifted from a first pair of rims onto a second pair of rims or vice versa only when the pulleys around which the belt is trained are in motion. The shifter is normally movable directly by hand and includes a fork whose prongs straddle a portion of the belt and are movable transversely of the direction of lengthwise movement of such belt portion. The just described belt gears do not allow for requisite control of forces which are transmitted by way of the manually movable shifter.

Certain recent types of belt gears employ spring-biased shifters for the belt and selector means for indirectly changing the position of the shifter by way of the biasing means. An advantage of such belt gears is that the selector means can be moved to a desired position to thereby select the transmission ratio between the driving and driven pulleys while the belt is idle whereby the biasing means compels the shifter to change its position as soon as the belt is set in motion. The biasing means stores energy when the selector means is adjusted while the belt is idle and is capable of dissipating such energy when the belt is driven because the belt then offers a greatly reduced resistance to sidewise movement. Furthermore, the biasing means protects the belt against excessive stretching not only when the belt is idle but also when the pulleys are in motion.

As a rule, the just described recent types of belt gears employ several discrete springs which are stressed to produce opposing forces acting on the shifter. An additional spring is used to serve as a yieldable detent for the selector means so that the latter can remain in a desired position. Furthermore, such belt gears employ many additional component parts which contribute considerably to the initial and maintenance cost and render the belt gears prone to malfunction. The belt gears occupy too much room so that they cannot be used in compact motion picture projectors or analogous apparatus.

SUMMARY OF THE INVENTION

An object of the invention is to provide a simple, lightweight, rugged and long-lasting variable-speed belt gear which is small enough to be capable of being used in a compact motion picture projector or the like.

Another object of the invention is to provide a belt gear which can drive one of its pulleys at two or more speeds, wherein the shifter can be set up to change the speed of the one pulley while the belt is idle but which allows for immediate speed change when the belt is in motion, and which is assembled of a very small number of simple parts.

A further object of the invention is to provide a variable-speed belt gear wherein the biasing means which is interposed between the selector means and the shifter can also serve as a yieldable detent for the selector means.

Still another object of the invention is to provide a variable-speed belt gear wherein a single resilient element suffices to transmit motion to the shifter and to serve as a simple but reliable detent for the selector means.

An additional object of the invention is to provide a belt gear whose components can be assembled prior to mounting in the housing of a motion picture projector or the like, wherein the belt is protected against excessive stressing in response to movements or biasing of the shifter, and wherein the shifter can indirectly receive motion from manually actuatable or remotely controlled selector means.

The improved variable-speed belt gear comprises a driving pulley and a driven pulley each having coaxial first and second rim portions, and endless flexible belt which is trained over the pulleys, and novel speed changing means which is operable to move the belt from the first rim portions onto the second rim portions or vice versa. The speed changing means comprises a speed selector (preferably a rotary knob) which is movable between first and second positions and through an intermediate position, a belt-engaging shifter which is movable between a first position in which the belt is trained over the first rim portions and a second position in which the belt is trained over the second rim portions, and resilient means (preferably a simple torsion spring) for respectively urging the selector and the shifter to their first and second positions in the first and second positions of the selector. The shifter includes a fork, a sheave or another suitable belt-engaging portion which is movable transversely of the direction of movement of the adjacent belt portion, and the intermediate position of the selector is preferably a dead center position. The resilient means is arranged to store energy in response to movement of the selector to its intermediate position and to thereupon propel the selector to its first position as soon as the selector moves beyond the intermediate position on its way from the second position, or vice versa.

The tension of the belt is preferably such that, when the pulleys are idle, the shifter remains in its momentary position in spite of movement of the selector whereby the resilient means stores energy which suffices to move the shifter to a different position as soon as the belt is set in motion in response to rotation of the pulleys.

The novel features which are considered as characteristic of the invention are set forth in particular in the appended claims. The improved belt gear itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 illustrates the structure of FIG. 1 but with the selector means in another position.

DESCRIPTION OF THE PREFERRED EMBODIMENTS

Figure 1:
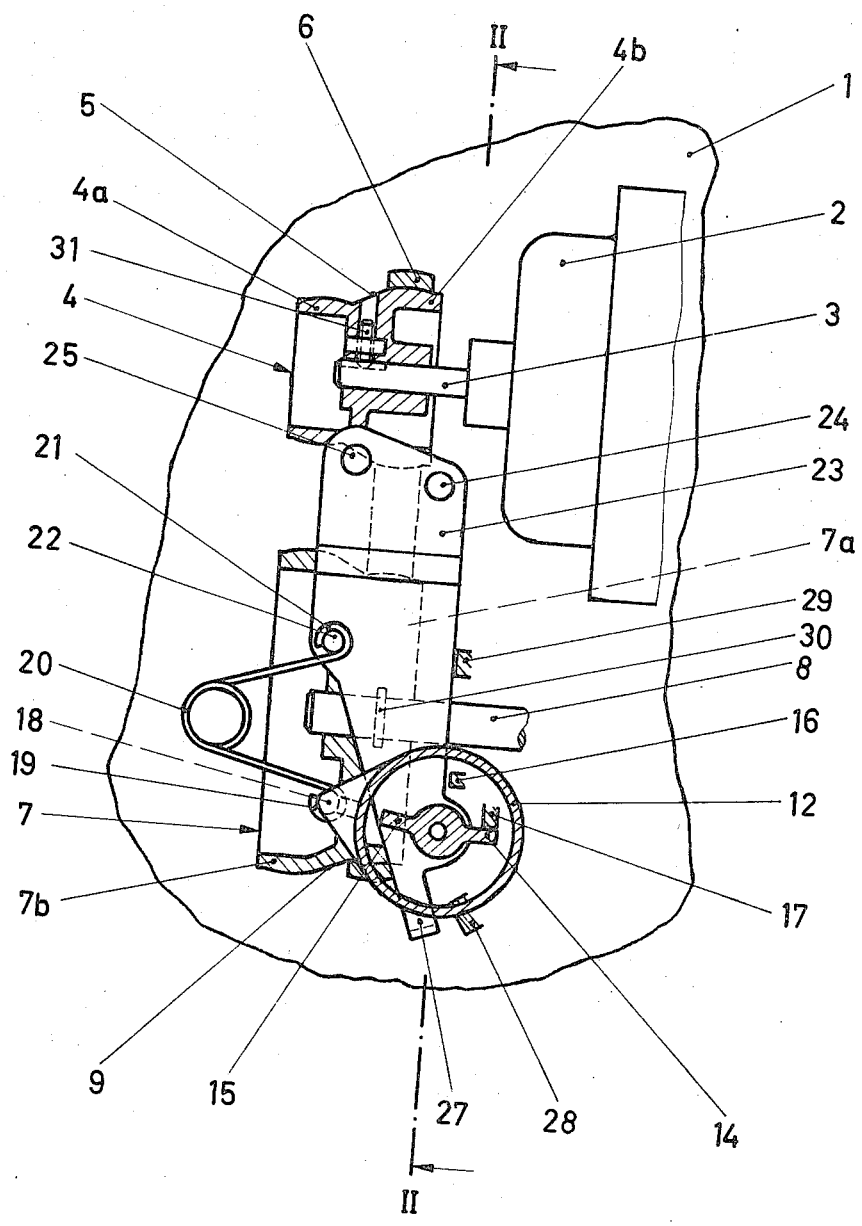
FIG. 1 is a fragmentary sectional view of a motion picture projector including a variable-speed belt gear which embodies the invention, the selector means being shown in one of its positions.
Figure 2:
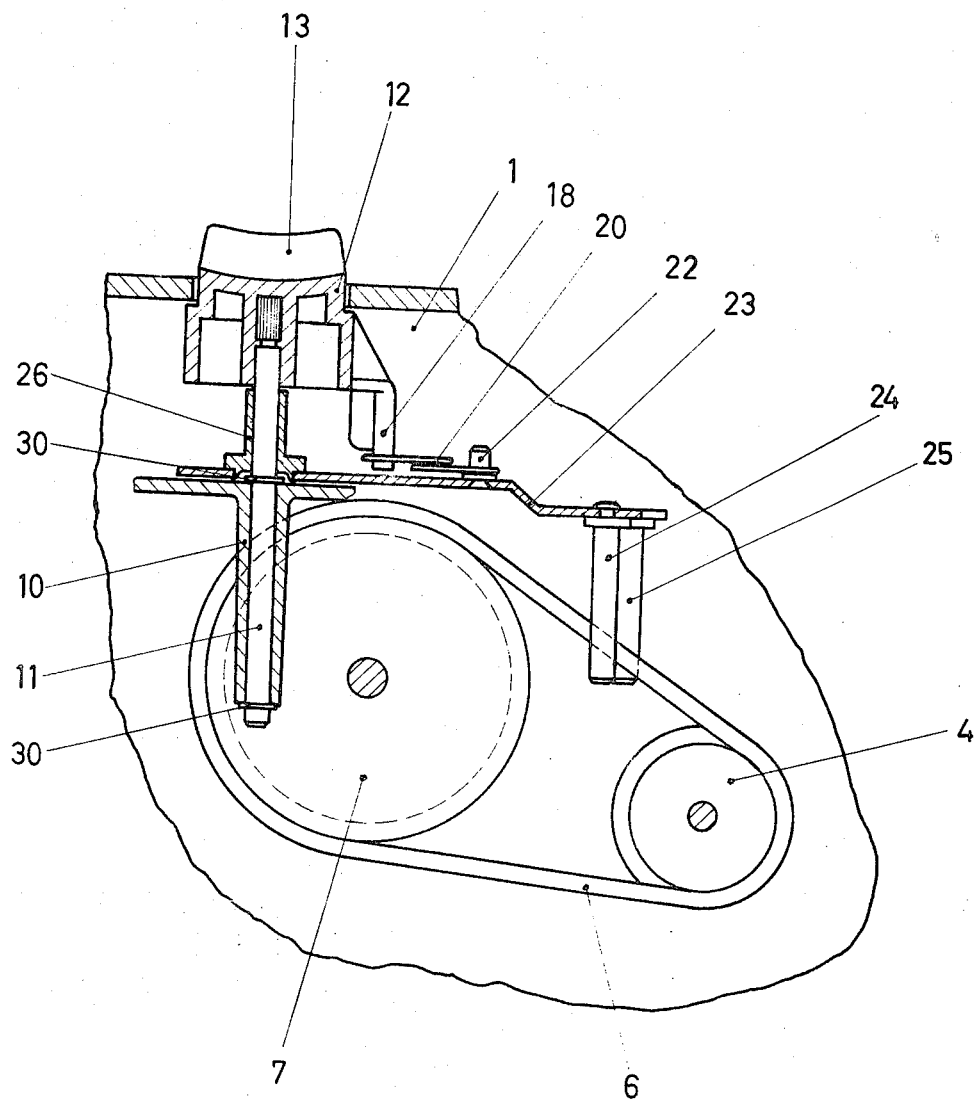
FIG. 2 is a sectional view as seen in the direction of arrows from the line II—II of FIG. 1.

Referring first to FIGS. 1 and 2, there is shown a portion of a motion picture projector which comprises a housing 1. The housing 1 accommodates a prime mover here shown as an electric motor 2 having an output shaft 3 which is separably connected with a first or driving two-step pulley 4. This pulley comprises a smaller-diameter rim portion 4a, a larger-diameter rim portion 4b and a conical intermediate portion 5 which provides for a gradual transition between the external surfaces of the rim portions 4a and 4b. A second or driven two-step pulley 7 is secured to the input shaft 8 of a transmission (not shown) and comprises a smaller-diameter rim portion 7a which is coplanar with the larger-diameter rim portion 4b, a larger-diameter rim portion 7b which is coplanar with the smaller-diameter rim portion 4a and a conical intermediate portion 9 which provides for a gradual transition between the external surfaces of the rim portions 7a and 7b. The transmission whose input shaft 8 is driven by the pulley 7 has an output element which can drive a spool or reel for motion picture film in the projector. An endless belt 6 is trained over the pulleys 4 and 7 without resorting to a belt tightening device. The diameters of the coplanar rim portions 4a, 7b and 4b, 7a are selected in such a way that the belt 6 is a tight fit when it is trained over the rim portions 4a, 7b or over the rim portions 4b, 7a.

The housing 1 further accommodates a fixed bearing sleeve 10 for a shaft 11 which carries at its outer end a speed or RPM selector knob 12. The knob 12 has a handgrip portion 13 which is accessible at the outer side of the housing 1. The inner portion of the selector knob 12 is provided with two angularly spaced projections 14 and 15 best shown in FIG. 1. The housing 1 comprises two fixed stops 17 and 16 which are respectively located in the path of movement of projections 14 and 15 to thus determine two preselected angular positions for the knob 12. In the first angular position which is shown in FIG. 1, the projection 14 of the knob 12 abuts against the stop 17 of the housing 1. Such angular position of the knob 12 corresponds to a first angular position of a belt shifter 23 which is turnable on the shaft 11 and has a bifurcated end portion provided with two prongs 24, 25 which straddle the adjacent portion of the belt 6. When the shifter 23 is caused to assume the first position shown in FIG. 1, its prongs 24, 25 maintain the belt 6 in the common plane of the rim portions 4b and 7a. Consequently, when the motor 2 is on to drive the pulley 4, the pulley 7 will drive the input shaft 8 at a relatively high speed. FIG. 3 illustrates the knob 12 in the other angular position in which the projection 15 of the knob abuts against the stop 16 of the housing 1. The belt shifter 23 is held in a second position in which its prongs 24 and 25 maintain the belt 6 in the common plane of the rim portions 4a and 7b. Consequently, the input shaft 8 is rotated at a relatively low speed when the motor 2 is on to rotate the pulley 4.

The knob 12 is further provided with an eccentric crank pin 18 which extends into an eye or socket 19 at the free end of one leg of a resilient element here shown as a torsion spring 20. The free end of the other leg of the torsion spring 20 is provided with a second eye or socket 21 which receives a pin 22 on the belt shifter 23. The pin 22 is remote from the axis around which the shifter 23 and knob 12 can turn (such axis is defined by the shaft 11). The belt shifter 23 is formed with an extension 27 which bears against a fixed abutment 28 in the housing 1 when the prongs 24 and 25 maintain the belt 6 in the common plane of the rim portions 4a and 7b (see FIG. 3). A second fixed abutment 29 of the housing 1 is located in the path of movement of an edge face of the belt shifter 23 to arrest the latter in the position shown in FIG. 1 in which the prongs 24, 25 maintain the belt 6 in the common plane of the rim portions 4b and 7a. In order to insure proper guidance of the belt shifter 23 during movement from engagement with the abutment 28 into engagement with the abutment 29 or vice versa, the shifter 23 is riveted or otherwise secured to a cylindrical hub 26 which is rotatable on the shaft 11. The prongs 24 and 25 are preferably of cylindrical shape and constitute elongated pins or posts which are riveted or otherwise secured to that end portion of the shifter 23 which is remote from the shaft 11.

The reference characters 30 indicate retaining rings one of which holds the pulley 7 against axial movement relative to the input shaft 8 and the other of which holds the shaft 11 against axial movement in the sleeve 10. The output shaft 3 of the motor 2 has an axially parallel peripheral groove for the tip of a radially extending screw 31 which separably and axially adjustably secures the pulley 4 to the shaft 3. Adjustments of the pulley 4 in the axial direction of the output shaft 3 are desirable in order to respectively place the rim portions 4a and 4b into common planes with the rim portions 7b and 7a.

When the belt shifter 23 dwells in the position shown in FIG. 1 in which its edge face engages the fixed abutment 29 of the housing 1, its prongs 24 and 25 maintain the belt 6 in the common plane of the rim portions 4b and 7a. As mentioned above, when the motor 2 is on and the belt 6 assumes the position shown in FIG. 1, the pulley 7 drives the input shaft 8 of the transmission at a relatively high speed. In such position of the belt shifter 23, the knob 12 dwells in its first angular position in which its projection 14 abuts against the fixed stop 17 of the housing 1. The spring 20 biases the knob 12 and the shifter 23 to their illustrated positions. If the motor 2 is at a standstill and the user of the projector wishes to select a lower speed for the input shaft 8 before the motor is started again, the knob 12 is rotated in a clockwise direction, as viewed in FIG. 1, so that it reaches the second angular position in which its projection 15 abuts against the fixed stop 16. During such angular movement, the knob 12 moves to and beyond a dead-center intermediate position and stresses the torsion spring 20 which automatically propels the knob 12 to the angular position of FIG. 3 as soon as the knob moves beyond the intermediate position. The reverse occurs when the knob 12 is rotated counterclockwise from the position of FIG. 1. Thus, when the knob 12 reaches and moves slightly beyond its intermediate position, the spring 20 propels the projection 14 against the stop 17 so that the knob 12 reassumes the position of FIG. 1. The spring 20 stores energy while the knob 12 moves from the position of FIG. 1 or FIG. 3 toward the intermediate position and dissipates energy to propel the knob to the other position. If the motor 2 is at a standstill while the knob 12 is being rotated from the position of FIG. 1 to the position of FIG. 3, the prong 24 is caused to bear against the adjacent edge of the belt 6 under the action of the torsion spring 20 (i.e., the shifter 23 tends to rotate counterclockwise in response to rotation of the knob 12 in a clockwise direction, or vice versa) but is incapable of actually shifting the belt 6 from the rim portions 4b and 7a onto the rim portions 4a and 7b. However, as soon as the motor 2 is started again, the resistance of the belt 6 to sidewise movement decreases considerably so that the spring 20 is capable of causing the prong 24 to shift the belt 6 to the position shown in FIG. 1. Inversely, when the motor 2 is at a standstill, when the belt 6 is trained over the rim portions 4a and 7b and the shifter 23 dwells in the position of FIG. 3, a movement of the knob 12 from the position of FIG. 3 to the position of FIG. 1 causes the spring 20 to urge the prong 25 against the adjacent edge of the belt 6 but the belt remains in the position of FIG. 3 as long as the motor 2 remains at a standstill.

The knob 12 can be rotated prior to or after the motor 2 is started. The difference is only that, when the knob 12 is rotated while the motor 2 is at a standstill, the angular position of the shifter 23 changes very little or not at all, i.e., the position of the pin 22 remains substantially unchanged while the pin 18 shares the angular movement of the knob 12. The shifting of the belt 6 then takes place after the motor 2 is started again. However, if the knob 12 is rotated while the motor 2 is on, the spring 20 is free to immediately change the angular position of the shifter 23 so that the belt 6 is moved from the rim portions 4a, 7b onto the rim portions 4b, 7a or vice versa.

The pivot axis for the shifter 23 (which resembles a one-armed lever) is preferably located in the symmetry plane between the two end positions of the eyes 19 and 21. Consequently, the force with which the torsion spring 20 tends to turn the shifter 23 is identical for both directions of angular movement of the shifter. It will be noted that the torsion spring 20 serves as a simple detent for the selector knob 12 as well as a means for storing energy when the knob 12 is being rotated while the motor 2 is idle. Furthermore, the spring 20 serves as a simple but reliable means for limiting the magnitude of forces which can be transmitted from the knob 12 to the shifter 23 and from the prong 24 or 25 of the shifter to the belt 6. This protects the belt against excessive deformation, particularly against excessive stretching.

In the illustrated embodiment, the selector knob 12 is rotatable directly by hand. However, it is equally within the purview of the invention to provide suitable electric, pneumatic, hydraulic or magnetic remote-control means for changing the position of the knob 12 and for thereby changing the position of the shifter 23, either immediately or upon renewed starting of the prime mover. The cost of such remote-control means is much less than in conventional belt gears. An advantage of remote-control means for moving the selector knob 12 is that the position of the knob 12 and shifter 23 can be selected at will, i.e., these parts can be installed in such portions of the housing 1 which are not accessible from without. The feature that the shifter 23 is coaxial with the selector knob 12 brings about additional simplification in the construction of the belt gear and a further reduction of its space requirements. Thus, only one shaft 11 has to be mounted in the housing 1 so that the number of journals, bearings and bores can be reduced to a minimum. At least the major part of the belt gear can be assembled in advance to be thereupon inserted into and mounted in the housing 1. The number of parts in the improved belt gear is much less then in heretofore known belt gears.

The shifter 23 preferably constitutes a one-armed lever with the prongs 24 and 25 at its free end. The knob 12 resembles a toggle switch. It is further clear that the improved belt gear can be used for driving the input shaft 8 or another rotary element at three or more speeds. This can be achieved by providing the belt gear with a suitable force limiting device of known design.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A variable-speed belt gear, particularly for use in motion picture projectors, comprising a driving pulley and a driven pulley each having coaxial first and second rim positions; an endless flexible belt trained over said pulleys; and speed changing means operable to move said belt from said first rim portions onto said second rim portions or vice versa, including a speed selector pivotable between first and second positions about a predetermined axis, a belt-engaging shifter pivotable about said predetermined axis between a first position in which said belt is trained over said first rim portions and a second position in which said belt is trained over said second rim portions, and a torsion spring for respectively urging said selector and said shifter to said first and second positions in the first and second position of said selector, said torsion spring having a first leg coupled to said selector at a point remote from said predetermined axis and a second leg coupled to said shifter at a point remote from said predetermined axis.

2. A variable-speed belt gear, particularly for use in motion picture projectors, comprising a driving pulley and a driven pulley each having coaxial first and second rim portions; an endless flexible belt trained over said pulleys; and speed changing means operable to move said belt from said first rim portions onto said second rim portions or vice versa, including a speed selector movable between first and second positions, a belt-engaging shifter movable between a first position in which said belt is trained over said first rim portions and a second position in which said belt is trained over said second rim portions, and resilient connected between said selector and said shift means for respectively urging said selector and said shifter to said first and second positions in the first and second positions of said selector, the tension of said belt being such that, when said belt is idle, said shifter remains in its momentary position in spite of movement of said selector from its first or second position whereby said resilient means stores energy which suffices to move said shifter to a different position as soon as the belt is set in motion in response to rotation of said driving pulley.

3. A belt gear as defined in claim 2, wherein said shifter includes a belt-engaging portion which is movable by said resilient means transversely of the direction of lengthwise movement of the adjacent portion of said belt, said selector being movable through a dead-center position located between said first and second positions thereof and said resilient means being arranged to store energy in response to movement of said selector toward said dead-center position and to thereupon urge said selector toward said first position as soon as said selector moves beyond said dead-center position in a direction away from said second position or vice versa.

4. A belt gear as defined in claim 2, wherein said shifter and said selector are turnable about a common axis and said resilient means is respectively arranged to bias said shifter clockwise and counterclockwise in response to counterclockwise and clockwise turning of said selector.

5. A belt gear as defined in claim 2, wherein said resilient means comprises a torsion spring.

6. A belt gear as defined in claim 2, wherein said shifter is a lever which is pivotable between said first and second positions thereof.

7. A belt gear as defined in claim 2, wherein said selector is a knob which is rotatable between said first and second positions thereof.

8. A belt gear as defined in claim 2, further comprising first and second abutment means for respectively holding said shifter against movement beyond said first and second positions thereof.

9. A belt gear as defined in claim 2, further comprising first and second stop means for respectively holding said selector against movement beyond said first and second positions thereof.

10. A belt gear as defined in claim 2, wherein the diameter of said first rim portion of said first pulley exceeds the diameter of said second rim portion of said first pulley and the diameter of said second rim portion of said second pulley exceeds the diameter of said first rim portion of said second pulley, said first rim portions being located in a first common plane and said second rim portions being located in a second common plane, and further comprising prime mover means actuatable to rotate said driving pulley and a rotary member receiving torque from said driven pulley.

11. A belt gear as defined in claim 10, wherein each of said pulleys comprises a substantially conical intermediate portion providing a gradual transition between the respective first and second rim portions.

* * * * *